US007111953B2

(12) United States Patent
Hunag et al.

(10) Patent No.: US 7,111,953 B2
(45) Date of Patent: Sep. 26, 2006

(54) ELECTRONIC DEVICE WITH ILLUMINANT PORTION

(75) Inventors: Hua-Yu Hunag, Taipei (TW); Chih Cheng Liao, Banciao (TW)

(73) Assignee: ASUSTeK Computer Inc., Taipei (TW)

( * ) Notice: Subject to any disclaimer, the term of this patent is extended or adjusted under 35 U.S.C. 154(b) by 27 days.

(21) Appl. No.: 10/952,781

(22) Filed: Sep. 30, 2004

(65) Prior Publication Data

US 2005/0195617 A1 Sep. 8, 2005

(30) Foreign Application Priority Data

Mar. 8, 2004 (TW) .............................. 93106080 A

(51) Int. Cl.
*G01D 11/28* (2006.01)
*F21V 7/04* (2006.01)

(52) U.S. Cl. .......................... 362/26; 362/26; 362/555; 362/557

(58) Field of Classification Search .................. 362/26, 362/27, 551, 28, 555, 570; 345/156–169, 345/170, 173; 178/18.1, 19.2, 19.1
See application file for complete search history.

(56) References Cited

U.S. PATENT DOCUMENTS 6,876,546 B1 * 4/2005 Tsao ........................... 361/683
6,918,677 B1 * 7/2005 Shipman ...................... 362/26
2004/0192079 A1 9/2004 Lee et al.

FOREIGN PATENT DOCUMENTS

TW 516671 6/2000
TW 559328 3/2003

* cited by examiner

*Primary Examiner*—Sandra O'Shea
*Assistant Examiner*—Guiyoung Lee
(74) *Attorney, Agent, or Firm*—Birch, Stewart, Kolasch and Birch, LLP

(57) ABSTRACT

An electronic device includes a display portion with a monitor, an operating portion, a button portion and an illuminant. The operating portion is pivotally connected to the display portion, and includes a casing and a touch unit located inside the casing. The button portion is located in the casing and facing to the touch unit. There is no through seam provided between the button portion and the casing. At least one part of the button portion is pervious to light. The illuminant is installed in the casing and near the button portion.

10 Claims, 6 Drawing Sheets

ELECTRONIC DEVICE WITH ILLUMINANT PORTION

This Nonprovisional application claims priority under 35 U.S.C. §119(a) on Patent Application No(s). 093106080 filed in Taiwan, Republic of China on Mar. 8, 2004, the entire contents of which are hereby incorporated by reference.

BACKGROUND OF THE INVENTION

1. Field of Invention

The invention relates to an electronic device and, in particular, to an electronic device comprising a light pervious button portion and the illuminant.

2. Related Art

As the coming of the electronic age, people demand for and depend on the electronic products more. Taking notebooks for example, since the notebooks possesses the popular utility, they become more and more common. In this consumer-oriented era, not only the competitive price of the good products, but the quality and the utility are also concerned by the consumers. Therefore, the manufacturers are trying to make better product to meet consumer's needs.

To make the invention easier to be illustrated, a notebook is taken for example hereinafter. A conventional notebook 1 includes a display portion 11 and an operation portion 12. The display portion 11 includes a display 111. The operation portion 12 is pivoted to the display portion 11 and includes a casing 121, a button unit 122 and a switch unit 123. The button unit 122 includes a button portion 1221, a connecting-arm 1222 and a fixing portion 1223. The fixing portion 1223 is connected to the casing 121, and the button portion 1221 is connected to the fixing portion 1223 with the springy connecting-arm 1222. The fixing portion 1223 can be fixed on the casing 121 by the way of thermal fusing. Surely, the fixing portion 1223 can also be screwed on the casing 121 with screws (not shown).

Referring to FIG. 2, when the button portion 1221 is pressed to move toward a first direction d1, since the connecting-arm is springy and the fixing portion 1223 is fixed on the casing 121, a rebound is produced to make the button portion 1221 move toward a second direction d2 as the pressing force is released. In this case, the second direction d2 is reverse to the first direction d1.

The switch unit 123 is disposed in the casing 121 and is positioned under the button portion 1221. The switch portion 123 includes a switch 1231 and a circuit board 1232. When the button portion 1221 is pressed to move toward the first direction d1, the button potion 1221 contacts with the switch 1231, so as to act the switch 1231 to create electronic connection with the circuit board 1232.

Since the button unit 122 and the casing 121 are separated and assembled together, the bad assembling problem may happen during manufacturing, which reduces the production yield and increases the producing cost. Moreover, a through seam 3 is needed between the casing 121 and the button unit(s) 122 to avoid getting stuck. However, it is thus easy to accumulate dust in the trough seam 3 that causes the inconvenience for cleaning. Besides, when the environment light is insufficient, the users may not tell the right position of the buttons correctly, resulting in inconvenience of operations.

It is therefore a subjective to solve the above-mentioned problems.

SUMMARY OF THE INVENTION

In view of the above-mentioned subjective, the invention is to provide an electronic device, which is handy and is easy to be assembled and cleaned.

To achieve the above, an electronic device of the invention includes a display portion including a monitor, an operation portion, a button portion and an illuminant.

The operation portion is pivotally connected to the display portion and includes a casing and a touch unit installed inside the casing. The button portion is located in the casing and facing to the touch unit, and at least one part of the button portion is pervious to light. There is no through seam between the button portion and the casing. The illuminant is accommodated in the casing and is adjacent to the button portion.

As mentioned above, since there is no through seam set between the button portion and the casing of the electronic device of the invention, the problems of bad assembling and dust accumulating would not occur. The production yield can thus be improved and the inconvenience of cleaning is avoided. In addition, at least one part of the button is pervious to light and the illuminant is located facing to the button portion. Thus, after the electronic device is powered on, the light generated from the illuminant is emitted out through the button potion. Therefore, users can easily tell the location of the button portion in the dark and the device is handier.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
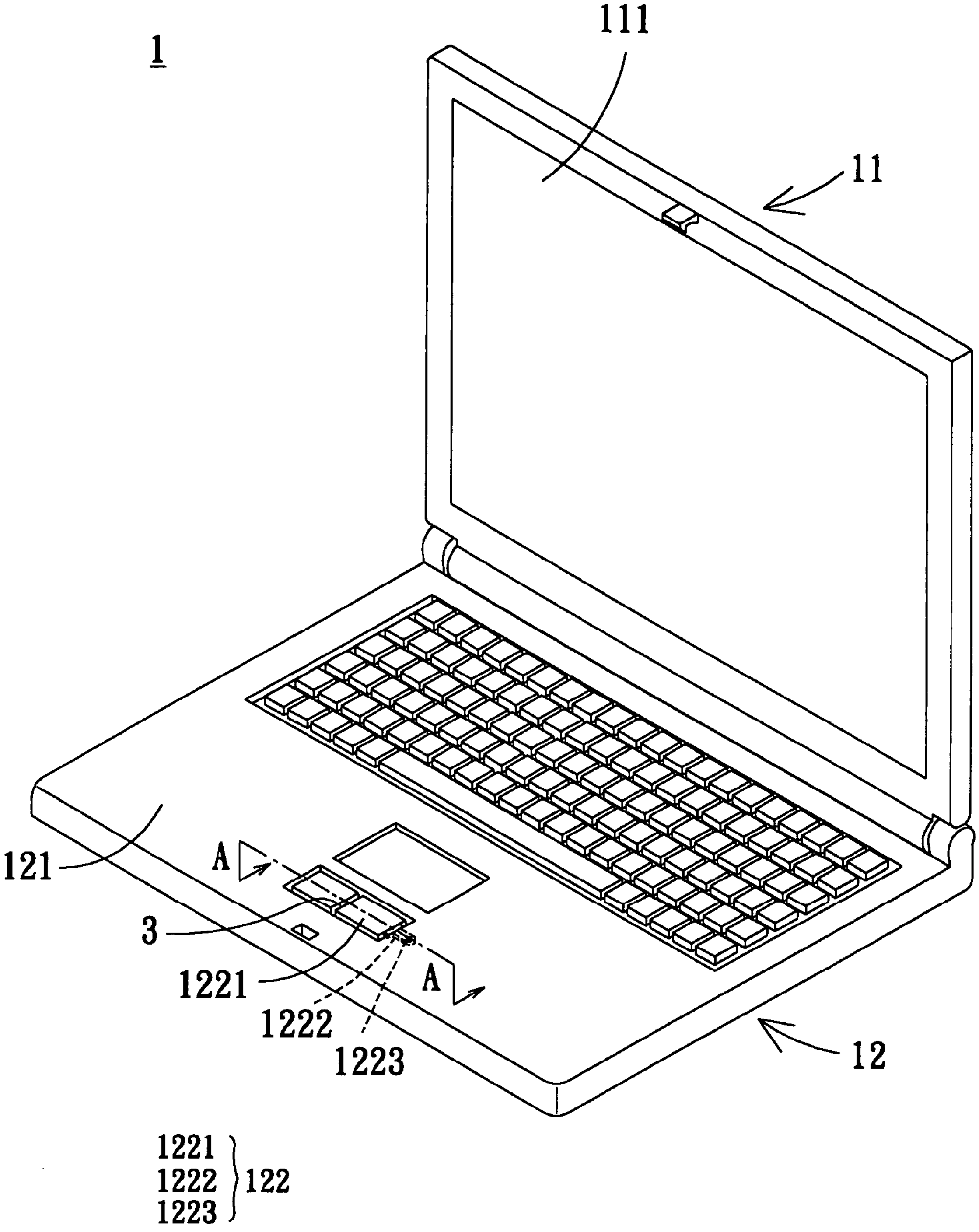
PRIOR ART FIG. 1
FIG. 1 is a top view of the conventional electronic device.
Figure 2:
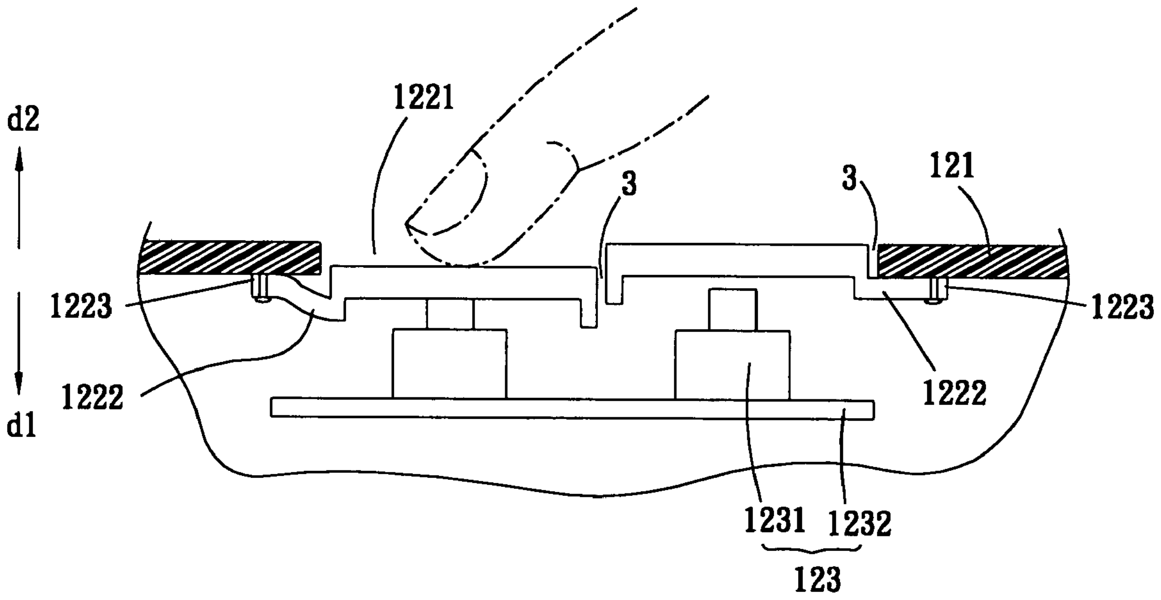
PRIOR ART FIG. 2
FIG. 2 is a sectional view showing the conventional electronic device along the line A—A.
Figure 3:
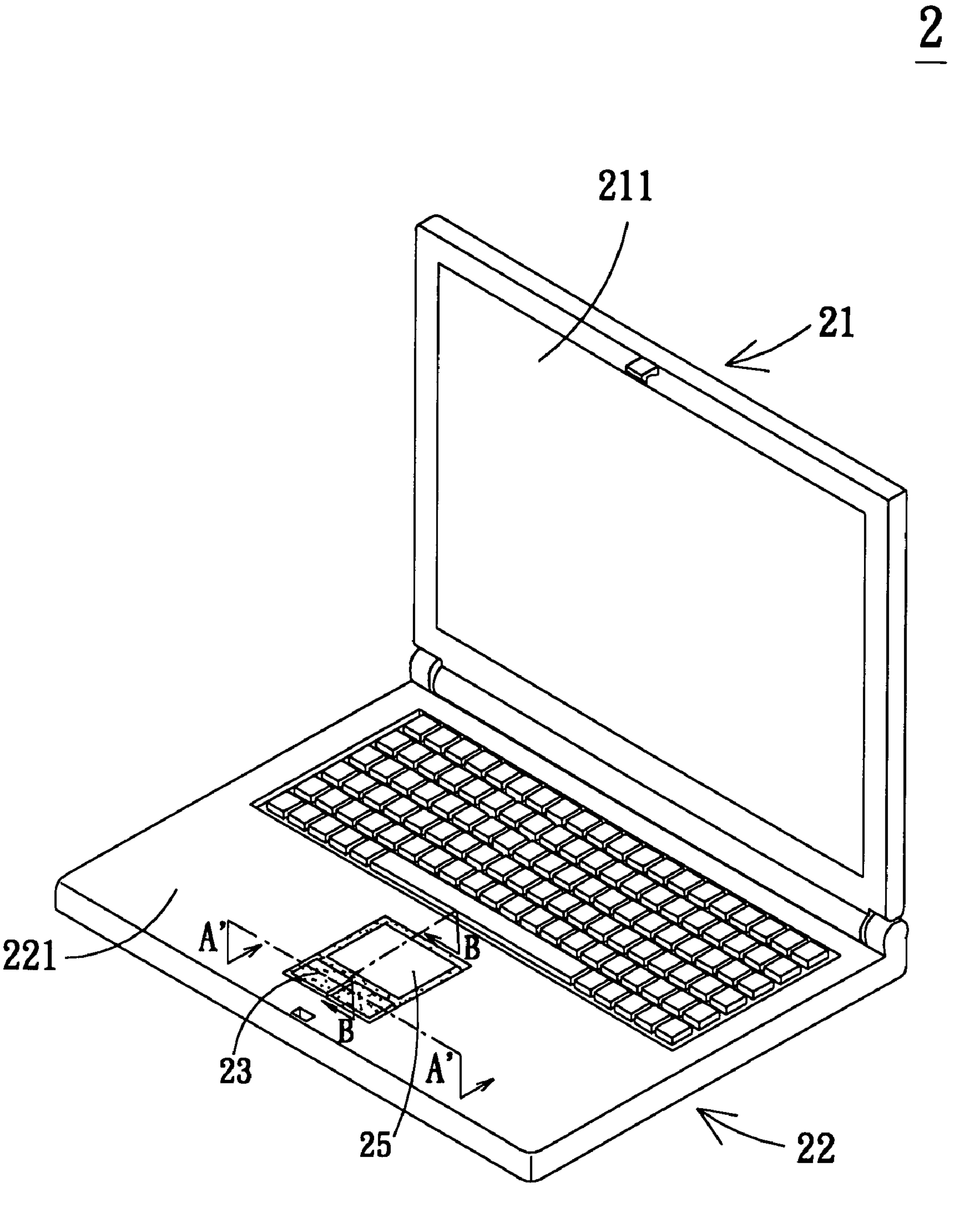
FIG. 3 is a schematic illustration showing an electronic device according to an embodiment of the invention.
Figure 4:
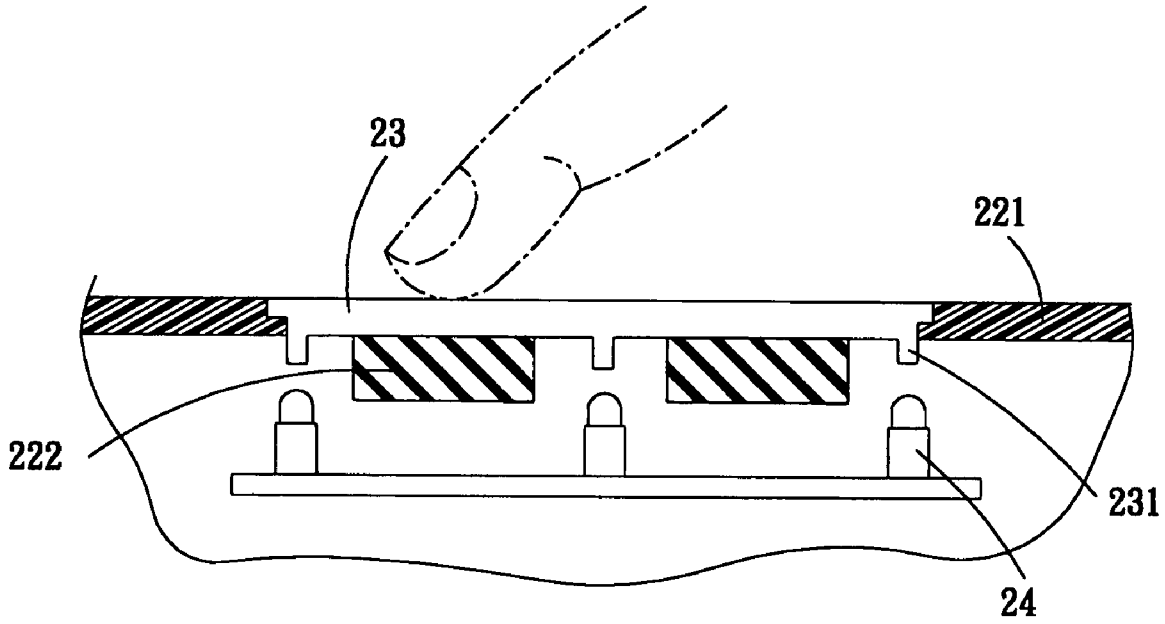
FIG. 4 is a sectional view showing the electronic device according to the embodiment of the invention along the line A'—A'.

Referring to FIG. 3 and FIG. 4, an electronic device 2 according to the embodiment of the invention includes a display portion 21, an operation portion 22, a button portion 23 and an illuminant 24.

The display portion 21 includes a monitor 211. The operation portion 22 is pivoted to the display portion 21 and includes a casing 221 and a touch unit 222 installed inside the casing 221. The touch unit 222 is a touch circuit board having a surface distributed with a plurality of sensing circuit. When the touch circuit board is touched, a capacitance or a resistance of the touch circuit board is changed to generate a signal.

The button portion 23 is located in the casing 221 and facing to the touch unit 222. At least one part of the button portion 23 is pervious to light and is opposite to the light pervious part of the casing 221. There is no through seam between the button portion 23 and the casing 221. The illuminant 24 is accommodated in the casing 221 and is facing to the button portion 23. The illuminant 24 can be a light-emitting diode (LED).

In this embodiment, the button portion 23 is embedded at the casing 221 by the way of two-shot injection molding. It should be noted that other methods make no through seam between the button portion 23 and the casing 221 could be used and are included in scope of the invention.

The button portion 23 can further includes at least one light guide rod 231 and one end of the light guide rod 231 is near the illuminant 24. After the electronic device 2 is powered on, the light generated by the illuminant 24 is emitted out through the button portion 23. Therefore, the users can tell the location of the button portion 23 clearly in the dark.

Figure 5A:
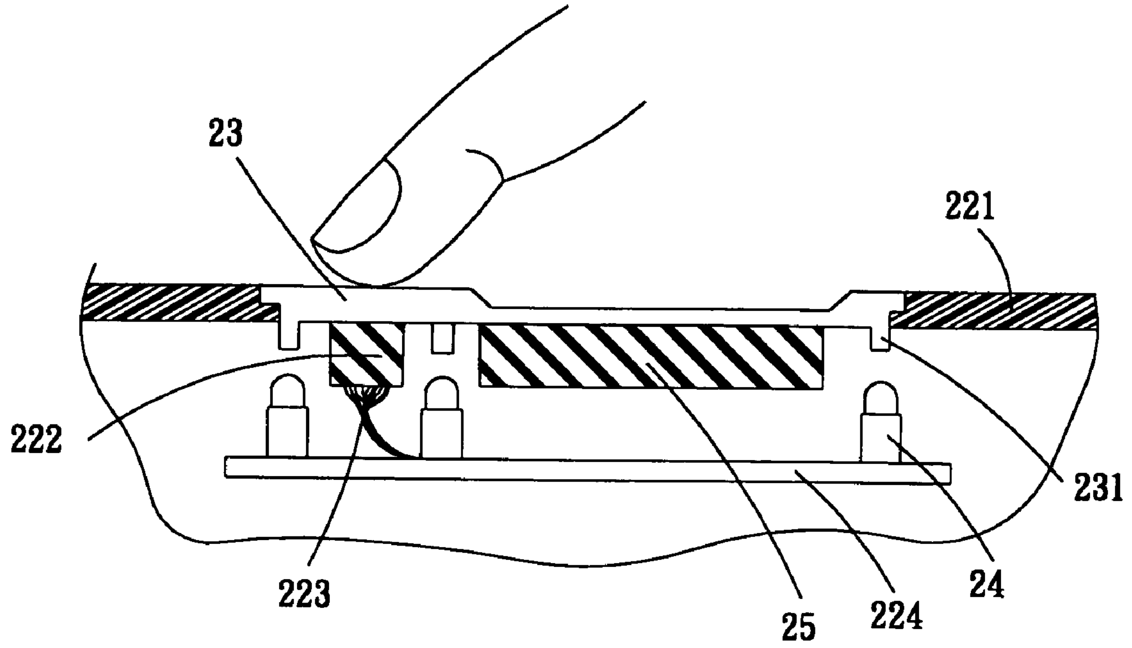
FIG. 5A is a sectional view showing the electronic device according to the embodiment of the invention along the line B—B.
Figure 5B:
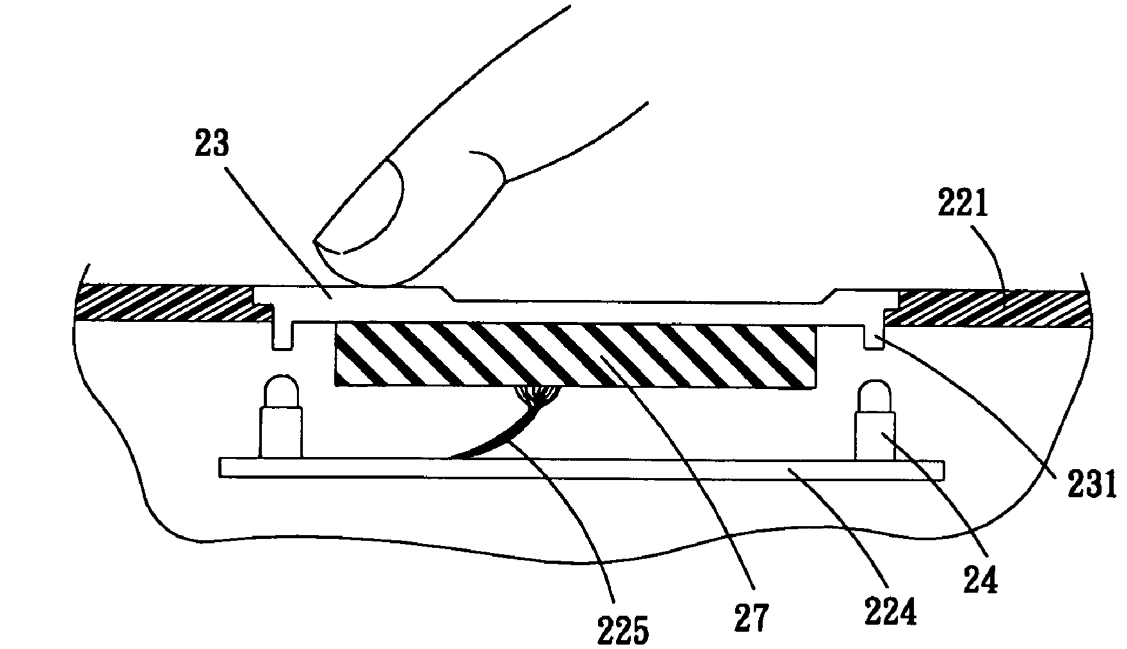
FIG. 5B is another sectional view showing the electronic device according to the embodiment of the invention along the line B—B.
Figure 5C:
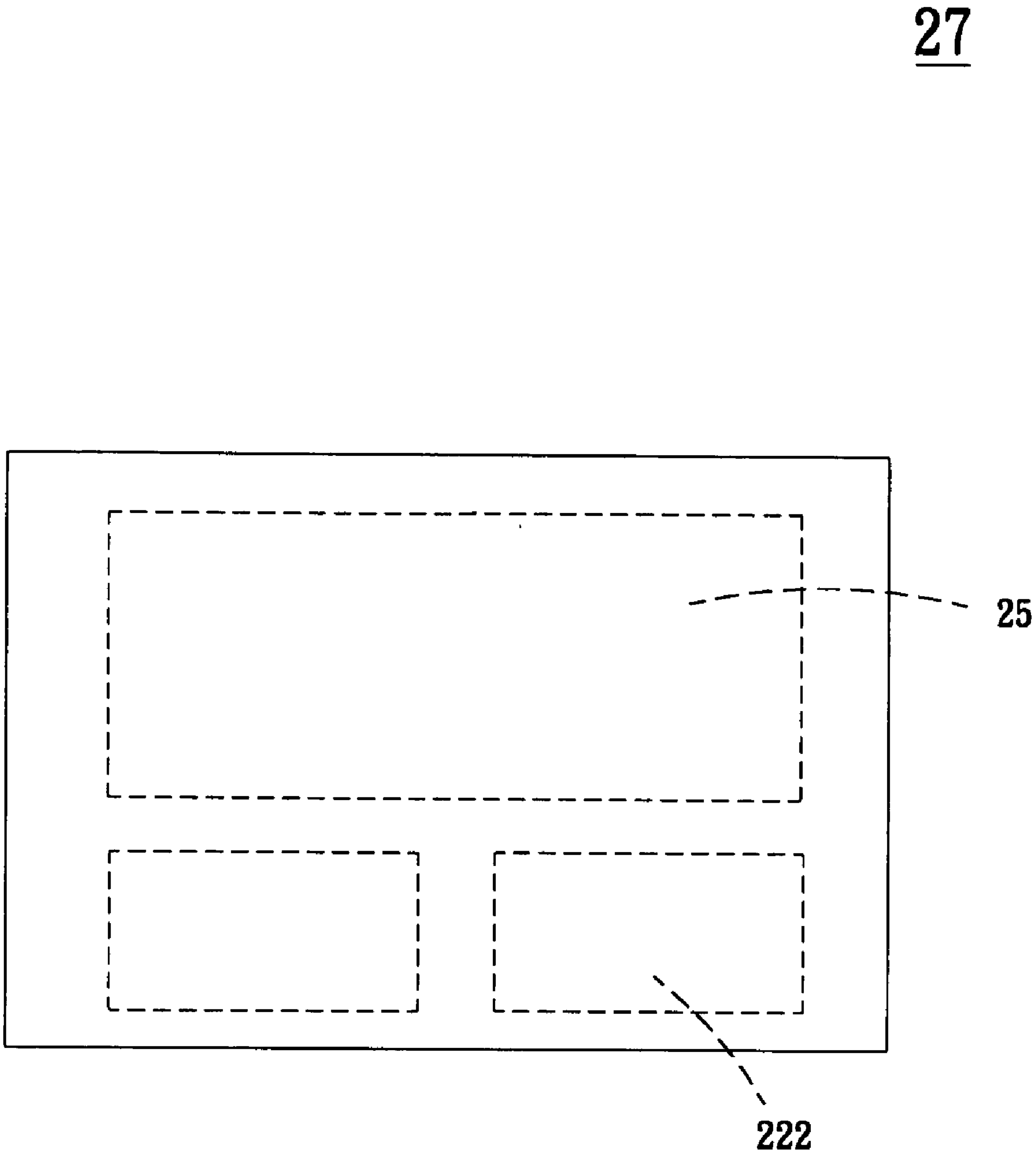
FIG. 5C is a top view of a multi-function circuit board according to the embodiment of the invention.

The electronic device 2 may further include a touch panel 25 for controlling the movement of a cursor and the touch panel 25 is near the button portion 23. The button portion 23 is disposed along the touch panel 25, and the light generated from the illuminant 24 is emitted out through the button portion 23. Referring to FIG. 5A, the touch panel 25 and the touch unit 222 are respectively carried out by two separated circuit boards. In this case, a first connecting portion 223 electrically connects the touch unit 222 and a main board 224. Referring to FIG. 5B, FIG. 5C and FIG. 3, the touch unit 222 and the touch panel 25 can be disposed on the different region of a multi-function circuit board 27, and a second connecting portion 225 electrically connects the touch unit 222, the touch panel 25 and the main board 224. Herein, the multi-function circuit board 27 is a special circuit board with both button and cursor-controlling functions. Referring to FIG. 5C, the multi-function circuit board 27 can carry out both the functions of the touch unit 222 and the touch panel 25.

In the embodiment, as mentioned above, since the button portion is embedded in the casing and there is no through seam between the button portion and the casing, the problems of bad assembling and dust accumulating would not occur. The production yield can be raised and the inconvenience of cleaning is avoided accordingly. In addition, at least one part of the button portion is pervious to light and the illuminant is located facing to the button portion. After the electronic device is powered on, the light generated form the illuminant is emitted out through the button potion. Thus, users can clearly tell the location of the button portion in the dark, so the device is handier.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic device, comprising:

a display portion, which includes a monitor;

an operating portion, which is pivotally connected to the display portion and comprises a casing and a touch unit installed inside the casing;

a button portion, which is located in the casing and facing to the touch unit, wherein at least one part of the button portion is pervious to light and there is no through seam between the button portion and the casing; and an illuminant, which is accommodated in the casing and is located adjacent to the button portion.

2. The electronic device according to claim 1, wherein the touch unit is a touch circuit board having a surface distributed with a plurality of sensing circuit, and when the touch circuit board is touched, a capacitance or a resistance of the touch circuit board is changed to generate a signal.

3. The electronic device according to claim 1, wherein the illuminant is a light-emitting diode (LED).

4. The electronic device according to claim 1, wherein the button portion is embedded at an opening of the casing by the way of two-shot injection molding.

5. The electronic device according to claim 1, wherein the button portion is a light pervious portion of the casing.

6. The electronic device according to claim 1, wherein the button portion further comprises at least one light guide rod, and one end of the light guide rod is near the illuminant.

7. The electronic device according to claim 1, wherein the electronic device further comprises a touch panel, the button portion is disposed along the touch panel, and the light generated from the illuminant is emitted out through the button portion.

8. The electronic device according to claim 7, wherein the touch panel is near the button portion and the touch panel is used to control the movement of a cursor.

9. The electronic device according to claim 7, wherein the touch unit and the touch panel are respectively carried out by two separated circuit boards, and a first connecting portion electrically connects the touch unit to a main board.

10. The electronic device according to claim 7, wherein the touch unit and the touch panel are respectively carried out by the same one circuit board, and a second connecting portion electrically connects the touch unit and the touch panel to a main board.

* * * * *